United States Patent
Pan (10) Patent No.: US 6,591,109 B2
(45) Date of Patent: Jul. 8, 2003

(54) CROSS CELL USER EQUIPMENT INTERFERENCE REDUCTION IN A TIME DIVISION DUPLEX COMMUNICATION SYSTEM USING CODE DIVISION MULTIPLE ACCESS

(75) Inventor: Jung-Lin Pan, Selden, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 111 days.

(21) Appl. No.: 10/003,487

(22) Filed: Nov. 1, 2001

(65) Prior Publication Data

US 2003/0036358 A1 Feb. 20, 2003

Related U.S. Application Data

(60) Provisional application No. 60/313,336, filed on Aug. 17, 2001.

(51) Int. Cl.[7] ............................. H04Q 7/20; H04B 15/00
(52) U.S. Cl. ......................... 455/452; 455/63; 370/335; 370/336
(58) Field of Search ................................ 455/450, 452, 455/62, 63, 67.1, 67.3, 509, 524; 370/329, 330, 335, 336, 347, 337

(56) References Cited

U.S. PATENT DOCUMENTS

| | | | |
|---|---|---|---|
| 5,355,522 A | 10/1994 | Demange | |
| 5,533,013 A | 7/1996 | Leppanen | |
| 6,212,384 B1 | 4/2001 | Almgreen et al. | |
| 6,360,077 B2 | 3/2002 | Mizoguchi | |
| 2002/0015393 A1 * | 2/2002 | Pan et al. | 370/335 |

FOREIGN PATENT DOCUMENTS

| | | |
|---|---|---|
| EP | 1087630 | 3/2001 |
| GB | 2320648 | 6/1998 |

OTHER PUBLICATIONS

Essam Sourour, "Time Slot Assignment Techniques for TDMA Digital Cellular Systems," IEEE Transactions on Vehicular Technology, vol. 43, No. 1, Feb. 1994, pp. 121–127.

Hitoshi Takanashi, Tomoyoski Oono & Toshiaki Tanaka, "Frequency–Segregated Dynamic Channel Allocation for Asynchronized TDMA/TDD Frame Among Base Stations," IEEE, 1996, pp. 933–937.

Mihailescu C. et al., Dynamic resource allocation for packet transmission in UMTS TDD–CDMA systems:, Vehicular Technology Conference, 1999 IEEE 49th Houston, TX, USA May 16–20 1999, Piscataway, NJ, USA, IEEE, US, May 16, 1999, pp. 1737–1741, XP010342115, ISBN: 0–7803–5565–2.

Yoshitaka Hara, Toshihisa Nabetani & Shinsuke Hara, "Time Slot Assignment for Cellular SDMA/TDMA Systems with Antenna Arrays," YRP Mobile Telecommunications Key Technology Research Laboratories Co., Ltd., pp. 1–4.

Thit Minn & Kai–Yeung Siu, "Dynamic Assiegnment of Orthogonal Variable–Spreading–Factor Codes in W–CDMA," IEEE, 2000, pp. 1429–1439.

* cited by examiner

Primary Examiner—Nguyen T. Vo
(74) Attorney, Agent, or Firm—Volpe and Koenig, P.C.

(57) ABSTRACT

Potentially interfering user equipments with respect to a particular UE are identified in a time division duplex communication system using code division multiple access. Timeslots used for uplink transmissions by a plurality of nearby UEs are identified. Each nearby UE is not in a cell of the particular UE and is geographically close to the particular UE. At the particular UE, an interference level is measured in each of the identified timeslots. The identified timeslots are classified using the measured interference level. Non-interfering and interfering UEs are determined using the identified timeslots for each UE and the timeslot classification.

34 Claims, 4 Drawing Sheets

CROSS CELL USER EQUIPMENT INTERFERENCE REDUCTION IN A TIME DIVISION DUPLEX COMMUNICATION SYSTEM USING CODE DIVISION MULTIPLE ACCESS

BACKGROUND

The invention generally relates to wireless time division duplex (TDD) communication systems using code division multiple access (CDMA). In particular, the invention relates to reducing cross cell user equipment interference in such systems.

Figure 1:
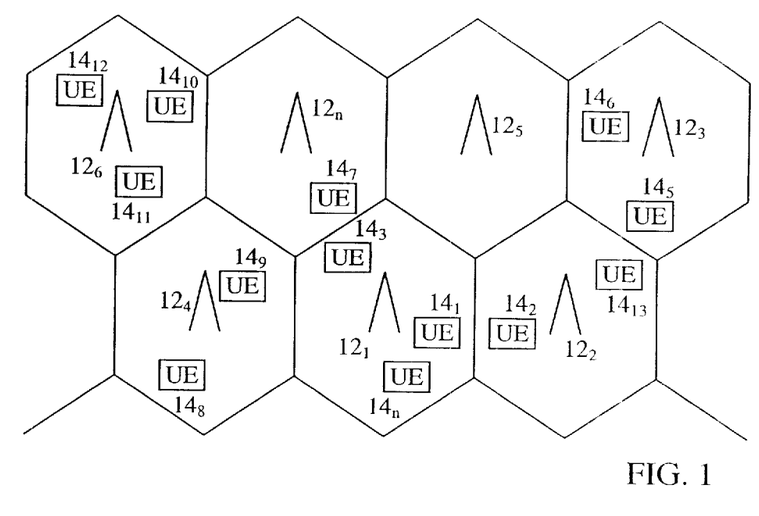
FIG. 1 is an illustration of a wireless TDD/CDMA communication system.

FIG. 1 is an illustration of a wireless TDD/CDMA communication system 10. The communication system 10 has base stations $12_1$ to $12_n$ (12) which communicate with user equipments (UEs) $14_1$ to $14_n$ (14). Each base station 12 has an associated operational area or cell. The base station communicates with UEs 14 in its cell.

In CDMA communication systems, multiple communications are sent over the same frequency spectrum. These communications are distinguished by their channelization codes. To more efficiently use the frequency spectrum, TDD/CDMA communication systems use repeating frames divided into timeslots, such as fifteen timeslots, for communication. In TDD, each cells' timeslots are used solely for either the uplink or downlink at a time. A communication sent in such a system has one or multiple associated code(s) or timeslot(s) assigned to it. The use of one code in one timeslot with spreading factor of sixteen is referred to as a resource unit.

Figure 2:
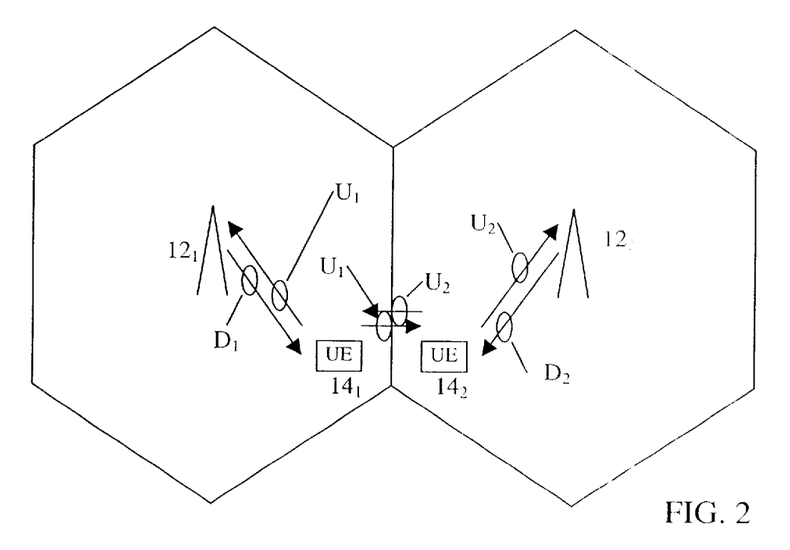
FIG. 2 is an illustration of cross interference between UEs.

Cross cell interference is a problem in such systems as illustrated in FIG. 2. If two different cells' UEs 14 are close to each other, their uplink transmissions interfere with the other UE's downlink transmissions in the same timeslot. As shown in FIG. 2, UE $14_1$ uplink transmission $U_1$ interferes with UE $14_2$ downlink transmission $D_2$. Likewise, UE $14_2$ uplink transmission $U_2$ interferes with UE $14_1$ downlink transmission $D_1$. Although the effective isotropic radiant power (EIRP) of UEs 14 is much less that base stations 12, the close proximity of the UEs 14 results in the unacceptable interference. This problem is exacerbated when adding new users or user services. Although a cell's base station and UE 14 may make timeslot interference measurements, such as interference signal code power (ISCP), to assure its new transmissions will not see unacceptable interference, other cells' users may end up experiencing unacceptable interference due to the new transmission. As a result, existing calls may be dropped or unacceptable quality of service (QOS) may occur.

Accordingly, it is desirable to reduce cross cell interference.

SUMMARY

Potentially interfering user equipments with respect to a particular UE are identified in a time division duplex communication system using code division multiple access. Timeslots used for uplink transmissions by a plurality of nearby UEs are identified. Each nearby UE is not in a cell of the particular UE and is geographically close to the particular UE. At the particular UE, an interference level is measured in each of the identified timeslots. The identified timeslots are classified using the measured interference level. Non-interfering and interfering UEs are determined using the identified timeslots for each UE and the timeslot classification.

DETAILED DESCRIPTION OF THE PREFERRED EMBODIMENT(S)

Although the UE cross cell interference reduction is explained in the context of unsectorized cells, the approach is extendable to any UE operating area division, such as sectors of a cell. In such an extension, each operating area, such as a sector, is treated as a separate cell in the analysis.

Figure 3:
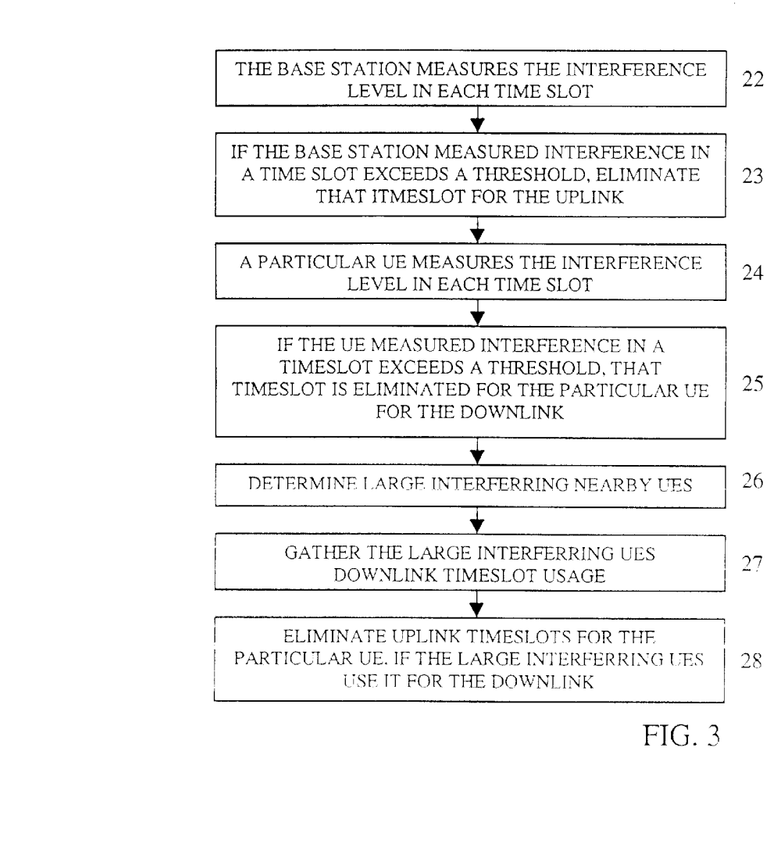
FIG. 3 is a flow chart for UE cross cell interference reduction.

FIG. 3 is a flow chart for UE cross cell interference reduction. For each cell, the cell's base station 12 measures the interference level in each timeslot, such as by using ISCP, step 22. The measured interference in each timeslot is compared to a threshold. If the measured interference in a timeslot exceeds the threshold, that timeslot is eliminated as a timeslot for any additional uplink communications in that cell, step 23. The threshold level is typically set by the system operator.

Each UE 14 measures the interference level in each timeslot, such as by ISCP, step 24. To determine available downlink timeslots for a particular UE 14, the measured interference in each timeslot is compared to a threshold. The threshold level is typically set by the system operator. If the measured interference exceeds the threshold, that timeslot is eliminated for the downlink for that particular UE 14, step 25.

Another concern is whether a particular UE's new uplink transmissions will interfere with another cell's UE downlink transmission. In TDD, UEs 14 in the same cell do not transmit on uplink and downlink in the same timeslot. Since the transmissions are new, other cells' UEs 14 cannot measure the resulting interference levels until the new transmissions begin. These new transmissions may result in a drop of a user or unacceptable QOS for existing users.

Figure 4:
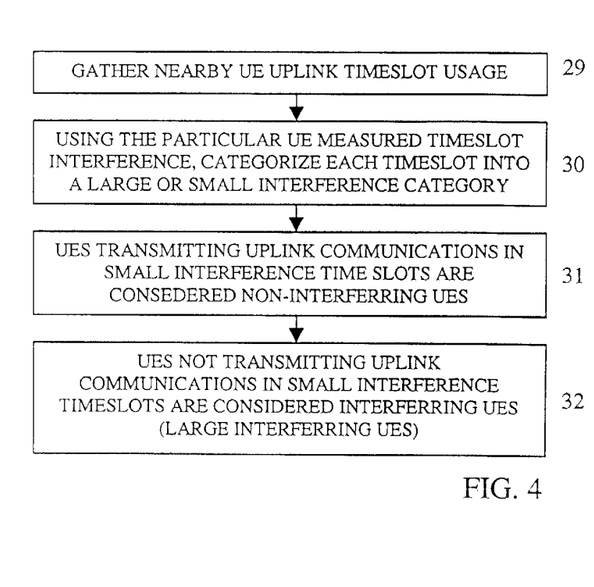
FIG. 4 is a flow chart for determining potentially interfered UEs.
Figure 5:
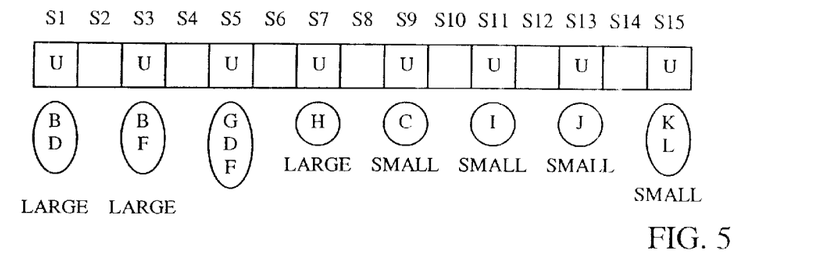
FIG. 5 is an illustration of neighboring cell UE usage.

Determining other nearby cells' UEs 14 which may interfere with a particular UE 14 is per the flow chart of FIG. 4. Each neighboring cell's UE uplink timeslot usage is gathered, step 29. This usage is typically stored at the radio network controller (RNC) 42 and/or at the node-B 46. Only the UE usage of nearby cells or, alternately, only adjacent cells are used. Further cells' UEs 14 are too far away to suffer interference from the particular UE 14. An example of nearby UE uplink usage is shown in FIG. 5. Each UE 14 is represented by a different letter, "B" to "L." The particular UE 14 is an unshown letter Using the particular UE's timeslot interference measurements, the timeslots are categorized into either a large or small interference category, step 30. The small or large interference determination is performed such as by a threshold test. The threshold is typically set by the system operator. All nearby cell UEs 14 transmitting uplink communications in timeslots having a small interference are considered too far away to suffer interference from the particular UE's uplink communications, step 31. All the other UEs are considered to be potentially interfered with by this UE's uplink communications, step 33.

To illustrate using the example of FIG. 5, UE A has nearby UEs B-L. Uplink timeslots are indicated with a "U." Out of the eight uplink timeslots (slots S1, S3, S5, S7, S9, S11, S13, S15), three slots have large interference (slots S1, S3 and S7) and five have small interference (slots S3, S9, S11, S13 and S5). The UEs 14 transmitting in small interference uplink slots are UE C, D, F, G, H, I, J, K and L and in large interference uplink slots are UE B, D, F and H. Although UE D and F have an uplink transmission in a large interference cell, they also have an uplink transmission in a small interference cell. As a result, UE D and F are not considered the interfering UEs 14 in the large interference timeslots. In this example, UE B and H are determined to be the interfering UEs.

In this simplified example, there was no ambiguous information. However, ambiguous information may exist. For instance, if UE H also had an uplink transmission in a small interference cell, such as slot S9, the information is ambiguous. UE H would be considered both a large interferor in slot S7 (being the only uplink user) and a small interferor in slot S9. In a conservative implementation, UE H could be deemed a large interferor. In a more aggressive implementation, UE H could be deemed a small interferor. There may be an unaccounted for interferor or interference source in that timeslot (slot S7).

Another situation where ambiguous information may occur is where multiple potential large interferors transmit uplink communications in the same timeslots. To illustrate, UE H may also transmit in the uplink in slots S1 and S3. As a result, UE B may or may not be a large interferor. UE H may be the only large interferor. In this case, UE B is still deemed a large interferor to be conservative.

Figure 6:
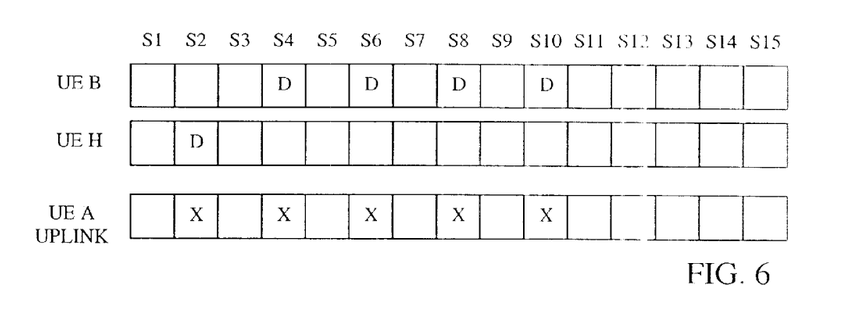
FIG. 6 is an illustration of large interfering UE timeslot usage.
Figure 7:
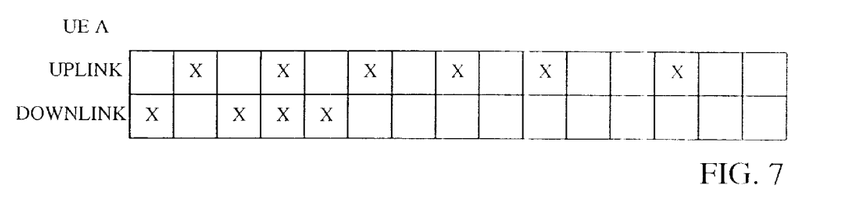
FIG. 7 is an illustration of available UE timeslots.

After the large interferor UEs 14 are determined, step 26, those UEs' downlink timeslot usage is gathered, such as in FIG. 6, step 27. For all the timeslots that the large interferors use for the downlink, that timeslot is eliminated for the uplink for that UE, as shown by an "X," step 28. As a result, a table such as in FIG. 7 is produced. The table indicates which timeslots are available to the particular UE 14. The available timeslots are blank and the non-available have an "X." Timeslots are assigned to the particular UE by selecting from the non-eliminated timeslots.

Figure 8:
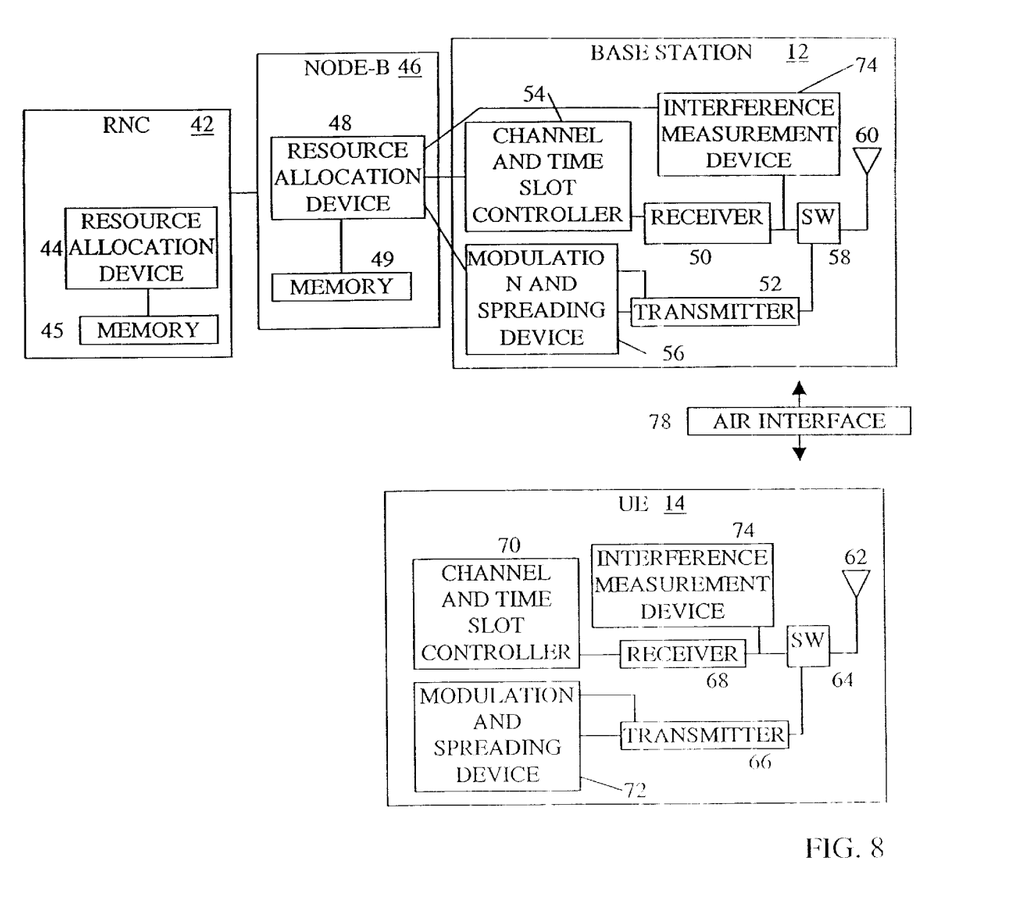
FIG. 8 is a simplified UE cross cell interference reduction system.

FIG. 8 illustrates a simplified system implementation for cross cell UE interference reduction. The RNC 42 has a resource allocation device 44. The resource allocation device 44 allocates the resources, such as code and timeslot assignments, for the cells. The resource allocation device 44 has an associated memory 45 for storing information, such as UE code and timeslot assignments, interference measurements and UE timeslot availability lists. Depending on the type of system, the computational component of cross cell UE interference reduction may be performed by the RNC resource allocation device 44, the Node-B resource allocation device 48 or shared between the two. Typically, performing the computation at the Node-B 46 allows for faster updates.

The Node-B 46 communicates with the radio network controller 42. The Node-B 46 has a resource allocation device 48 and an associated memory 49. The resource allocation device 44 allocates resources to that Node-B's users. The resource allocation device memory 49 stores information, such as the Node-B's UE timeslot and code assignments, interference measurements and UE timeslot availability lists.

The Node-B 46 typically communicates with a group of base stations 12. The base station 12 has a channel code and timeslot controller 54. The channel code and timeslot controller 54 controls the timeslots and channel codes assigned to user communications as directed by the Node-B 46 and RNC 42. A modulation and spreading device 56 processes data to be transmitted to the users. The data is processed to be time multiplexed with a channel code as directed by the channel and timeslot controller 54. A transmitter 52 formats the processed data for transfer over the radio interface 78. The resulting signal passes through an isolator or switch 58 and is radiated by antenna or antenna array 60.

Signals are received by the base station 12 using the antenna or antenna array 60. The received signals pass through the isolator or switch 58 to a receiver 50. The receiver 50 processes the received signals with channel codes in the timeslots directed by the channel code and the timeslot controller 54 to recover the received user data. The base station 12 also has an interference measurement device 74. The interference measurement device 74 measures the timeslot interference levels.

The UE 14 receives signals over the radio interface 78 using its antenna or antennal array 62. The received signals pass though an isolator or switch 64 to a receiver 68 to recover the received data for the user as directed by the channel code and timeslot controller 70. The channel code and timeslot controller 70 sends the channel code and timeslot information to the receiver 68 and UE modulation and spreading device 72. The controller 70 also retrieves the code and timeslot assignments signaled by the base station 12.

A UE interference measurement device 76 measures the interference levels in the timeslots. A modulation and spreading device 72 processes user data with the channel codes and timeslots as directed by the UE controller 70. The processed data is formatted for transmission over the air interface 78 by the transmitter 66. The resulting signal passes through the isolator or switch 64 and is radiated by the antenna or antenna array 62.

What is claimed is:

1. A method for determining user equipments (UEs) potentially interfering with a particular UE in a wireless time division duplex communication system using code division multiple access, the method comprising:

identifying timeslots used for uplink communications for each of a plurality of nearby UEs not in an operating area of the particular UE, the nearby UEs being in operating areas geographically close to the particular UE operating area;

measuring at the particular UE an interference level in each of the identified timeslots;

classifying the identified timeslots using the measured interference level; and determining non-interfering and interfering UEs using the identified timeslots for each nearby UE and the timeslot classification.

2. The method of claim 1 wherein the classifying is into a small interference category and a large interference category.

3. The method of claim 2 wherein the determining non-interfering and interfering UEs comprises determining the nearby UEs using the small interference category timeslots as non-interfering.

4. The method of claim 3 wherein others of the nearly UEs not considered non-interfering are considered as interfering UEs.

5. The method of claim 1 wherein the operating areas are cells.

6. The method of claim 1 wherein the operating areas are sectors of cells.

7. The method of claim 1 wherein the nearby UEs are UEs of adjacent operating areas to the particular UE operating area.

8. The method of claim 1 wherein the classifying is performed by comparing each identified timeslot's interference level to a threshold.

9. A method for assigning uplink timeslots to a particular user equipment (UE) in a wireless time division duplex communication system using code division multiple access, the method comprising:

identifying timeslots used for uplink communications for each of the plurality of nearby UEs not in an operating area of the particular UE, the nearby UEs being in operating areas geographically close to the particular UE operating area;

measuring at the particular UE an interference level in each of the identified timeslots;

classifying the identified timeslots using the measured interference level;

determining non-interfering and interfering UEs using the identified timeslots for each nearby UE and the timeslot classification;

eliminating downlink timeslots used by interfering UEs from potential uplink assignment; and assigning the particular UE uplink timeslots excluding the eliminated potential uplink timeslots.

10. The method of claim 9 further comprising a base station of the particular UE measuring an interference level in timeslots and eliminating timeslots for uplink assignment having the measured interference level over a threshold.

11. The method of claim 9 further comprising the particular UE measuring an interference level in timeslots and eliminating timeslots to be assigned to the particular UE for downlink communications having the measured interference level over a threshold.

12. The method of claim 9 wherein the operating areas are cells.

13. The method of claim 9 wherein the operating areas are sectors of cells.

14. A wireless time division duplex communication system using code division multiple access, the system comprising:

a radio network controller for identifying timeslots used for uplink communications for each of a plurality of nearby user equipments (UEs) in an operating area of a particular UE, the nearby UEs being in operating areas geographically close to the particular UE operating area, for classifying the identified timeslots using a measured interference level as measured by the particular UE, and for determining non-interfering and interfering UEs using the identified timeslots for each nearby UE and the timeslot classification.

15. The system of claim 14 further comprising the particular UE for measuring interference levels of the identified timeslots as the measured interference levels.

16. The system of claim 14 wherein the classifying is into a small interference category and a large interference category.

17. The system of claim 16 wherein the determining non-interfering and interfering UEs comprises determining the nearby UEs using the small interference category timeslots as non-interfering.

18. The system of claim 17 wherein others of the nearly UEs not considered non-interfering are considered as interfering UEs.

19. The system of claim 14 wherein the operating areas are cells.

20. The system of claim 14 wherein the operating areas are sectors of cells.

21. The system of claim 14 wherein the nearby UEs are UEs of adjacent operating areas to the particular UE operating area.

22. The system of claim 14 wherein the classifying is performed by comparing each identified timeslot's interference level to a threshold.

23. The system of claim 14 wherein the radio network controller for eliminating downlink timeslots used by the interfering UEs from potential assignment, and for assigning the particular UE uplink timeslots excluding the eliminated timeslots.

24. The system of claim 23 further comprising the particular UE measuring an interference level in timeslots and eliminating timeslots to be assigned to the particular UE for downlink communications having the measured interference level over a threshold.

25. A radio network controller (RNC) for use in a wireless time division duplex communication system using code division multiple access, the radio network controller comprising:

means for identifying timeslots used for uplink communications for each of a plurality of nearby user equipments (UEs) in an operating area of a particular UE, the nearby UEs being in operating areas geographically close to the particular UE operating area;

means for determining non-interfering and interfering UEs using the identified timeslots for each nearby UE and the timeslot classification as measured by the particular UE; and means for classifying the identified timeslots using the measured interference level.

26. The RNC of claim 25 wherein the classifying is into a small interference category and a large interference category.

27. The RNC of claim 26 wherein the determining non-interfering and interfering UEs comprises determining the nearby UEs using the small interference category timeslots as non-interfering.

28. The RNC of claim 27 wherein others of the nearly UEs not considered non-interfering are considered as interfering UEs.

29. The RNC of claim 25 wherein the operating areas are cells.

30. The RNC of claim 25 wherein the operating areas are sectors of cells.

31. The RNC of claim 25 wherein the nearby UEs are UEs of adjacent operating areas to the particular UE operating area.

32. The RNC of claim 25 wherein the classifying is performed by comparing each identified timeslot's interference level to a threshold.

33. The RNC of claim 25 further comprising:

means for eliminating downlink timeslots used by interfering UEs from potential assignment; and means for assigning the particular UE uplink timeslots excluding the eliminated timeslots.

34. The RNC of claim 33 further comprising means for eliminating timeslots to be assigned to the particular UE for downlink communications having a measured interference level as measured at the particular UE over a threshold.

* * * * *

UNITED STATES PATENT AND TRADEMARK OFFICE
CERTIFICATE OF CORRECTION

PATENT NO. : 6,591,109 B2  Page 1 of 1
DATED : July 8, 2003
INVENTOR(S) : Jung-Lin Pan It is certified that error appears in the above-identified patent and that said Letters Patent is hereby corrected as shown below:

Drawings,
Please replace Figure 2 with replacement Figure 2 as follows:

FIG. 2

Column 6,
Lines 1 and 45, delete the word "nearly", and insert therefor -- nearby --

Signed and Sealed this

Thirtieth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,591,109 B2
DATED : July 8, 2003
INVENTOR(S) : Jung-Lin Pan

It is certified that error appears in the above-identified patent and that said Letters Patent is hereby corrected as shown below:

Please replace Drawing Sheets 2 and 4 with replacement Drawing Sheets 2 and 4 attached hereto.

<u>Column 3,</u>
Line 11, after the word "small", delete "interference" and insert therefor -- interferences --.
Line 12, before the words ".The UEs", delete "S5" and insert therefor -- S15 --.

Signed and Sealed this

Eleventh Day of October, 2005

JON W. DUDAS
*Director of the United States Patent and Trademark Office*

FIG. 8